3,535,260
**METHOD OF STABILIZING A MONOETH-
ANOLAMINE SOLUTION BY ADDING
A TRIALKANOLAMINE**
Kshatra Pati Singh, Montreal, Quebec, Canada, assignor to Union Carbide Canada Limited, Toronto, Ontario, Canada, a company of Canada
No Drawing. Filed Mar. 25, 1968, Ser. No. 715,566
Int. Cl. B01d 47/02; C07c 91/04
U.S. Cl. 252—189                                          7 Claims

ABSTRACT OF THE DISCLOSURE

In the use of aqueous monoethanolamine solutions in the purification of natural gas, degradation of the monoethanolamine frequently occurs due to the presence of certain impurities such as hydrogen sulfide, carbonyl sulfide and mercaptans in the gas. Improved resistance to degradation is obtained by incorporating certain tertiary amines such as triethanolamine in the monoethanolamine solution.

---

The present invention relates to the treating of gas with aqueous monoethanolamine to remove certain impurities therefrom. More particularly it relates to a method and composition for "sweetening" natural gas by means of an aqueous monoethanolamine solution.

The use of aqueous monoethanolamine to remove certain impurities such as water, carbon dioxide, hydrogen sulfide and mercaptans from gas such as air or natural gas is well known. In the case of natural gas, purification systems for "sweetening" the natural gas are frequently established at the wellhead site so that the above impurities can be removed before the gas is delivered to a pipeline.

Briefly the process of removing such impurities from natural gas with aqueous monoethanolamine utilizes the principle of absorption and adsorption wherein a solution of monoethanolamine is contacted with the sour gas in a tray or packed absorber at a temperature ranging from 60° F. to 140° F. at moderate to high pressure. The process is usually a cyclic one wherein the monoethanolamine solution is contacted with the sour gas as explained above, and then the impurity rich monoethanolamine is discharged from the bottom of the adsorber and is subsequently regenerated by heat at 220°–250° F. at which temperature the most of the adsorbed impurities are removed.

The details of such adsorption of natural gas impurities is well known in the art and although gas "sweetening" with monoethanolamine has many advantages, shutdown and replacement of the ethanolamine solution must be carried out frequently due to degradation of the monoethanolamine. This is particularly true where the gas being subjected to purification contains sulfide compounds such as hydrogen sulfide, carbonyl sulfide and mercaptans.

It is therefore an object of the present invention to provide an aqueous monoethanolamine solution which has improved resistance to degradation in the presence of certain acid gases.

It is another object of the invention to provide a monoethanolamine solution for sweetening natural gas on a continuous basis which requires less frequent replacement.

These objects are accomplished by incorporating into an aqueous solution of monoethanolamine a stabilizing amount of a compound of the formula:

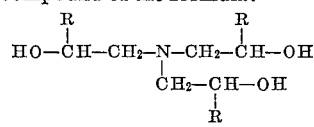

wherein R is a radical selected from the group consisting of hydrogen and an alkyl having from 1 to 4 carbon atoms.

Such compounds which were found to be of particular advantage were triethanolamine, triisopropanolamine and triisobutanolamine. These compounds can be prepared by various methods known in the art, for example, by reacting ammonia with the corresponding alkylene oxide.

It was found that the compounds of the present invention provide most effective stability in an aqueous monoethanolamine solution when they are present in an amount of from 0.1 percent by weight to about 15 percent by weight based on the weight of monoethanolamine. A particularly favourable concentration is from about 0.5 percent by weight to about 5 percent by weight.

The exact nature of the process whereby the compounds of this invention act as stabilizers in monoelkanolamine solutions is not known. It appears however that the degradation of monoethanolamine is accompanied by the formation of such certain degradative products of monoethanolamine. The products include: oxazolidinone-2 (OX)

(1) oxazolidinone-2 (OX).
(2) N-(2-hydroxyethyl)-ethylene diamine (HEED).
(3) N-(2-hydroxyethyl)-imidazolidinone-2 (IMID).
(4) Unknown nitrogeneous and sulfur containing compounds depending upon the nature of the impurities present in the solution.

In the samples tested it was found that aqueous monoethanolamine solutions without a stabilizing compound of the present invention and tested under the conditions described below in the presence of carbon dioxide and hydrogen sulfide contained considerable amounts of the four degradative products mentioned above. On the other hand monoethanolamine solutions containing triethanolamine as described in Examples 3 and 4 below contained little or no trace of such degradative products.

A particular test method was carried on a monoethanolamine solution containing certain impurities to determine the extent of degradation. The test was carried out on solutions containing the triethanolamine derivatives and those without such derivatives for purposes of comparison.

Since it is known from the experience of gas processors that monoethanolamine degradation occurs faster at high temperatures, the test was carried out at a temperature of approximately 150° C. and an operating pressure from 190 to about 200 p.s.i.g.

The test equipment consists essentially of a stainless steel pressure vessel equipped with a mechanical stirrer and a heating jacket. Gas inlet means is located on the vessel so that when the aqueous monoethanolamine test solution is in the vessel under pressure, a measured amount of nitrogen purge gas and samples of impurity gas such as carbon dioxide, hydrogen sulfide and mercaptans can be added to the vessel. A vent means is also located on the vessel for venting off excess gas. A thermocouple is also located in the vessel for indicating the temperature of the solution during testing.

EXAMPLE I 61.0 grams of monoethanolamine was charged into a reactor vessel containing 244.0 gms. of water. After flushing the reactor vessel with nitrogen, 51.8 gms. of carbon dioxide was introduced into the reactor at a pressure of approximately 50 p.s.i.g. The reactor was heated to 152° C. and the pressure inside the vessel was increased to 199 p.s.i.g. This temperature and pressure was maintained for approximately 4 hours during which time the reaction was stirred vigorously.

At the end of the 4 hours, the reaction was cooled and the pressure reduced. The excess gas was vented off. The contents of the reactor were removed and analyzed by vapor phase gas chromatograph. The extent of degradation was calculated based on the amount of monoethanolamine recovered. 58.89 gms. of monoethanolamine or 96.54% of starting material was recovered. Therefore the amount of monoethanolamine degraded during the heating period was 3.46 percent.

EXAMPLE 2

61.0 gms. of monoethanolamine was charged into a reactor together with 244.0 gms. of water. After flushing the reactor vessel with nitrogen, 21.0 gms. of hydrogen sulfide and 30.0 gms. of carbon dioxide were introduced into the reactor at a pressure of approximately 50 p.s.i.g. The reactor was heated to 151° C. and the pressure inside the vessel was increased to 193 p.s.i.g. This temperature and pressure was maintained for approximately 9.6 hours during whtich time the reaction was stirred vigorously. At the end of this period the recovered monoethanolamine was measured in the manner described in Example 1. 58.46 gms. of monoethanolamine was recovered or 95.84 percent of starting material. Therefore the amount of monoethanolamine degraded was 4.16 percent.

EXAMPLE 3

46.0 gms. of monoethanolamine and 244.0 gms. of water were charged into a reactor as described in Example 1. In addition 2.3 gms. of triethanolamine equivalent to approximately 5 percent by weight of monoethanolamine was added to the reactor. 11.0 gms. of carbon dioxide and 16.7gms. of hydrogen sulfide were introduced into the reactor at a pressure of approximately 50 p.s.i.g. The reactor was heated to 152° C. and the pressure inside the vessel was increased to 198 p.s.i.g. This temperature and pressure was maintained for approximately 4.1 hours during which time the reaction was stirred vigorously. At the end of this period the excess gas was vented off and the quantity of monoethanolamine remaining was analyzed by gas chromatography. The amount of monoethanolamine recovered was 45.71 gms. or 99.39 percent of the initial material.

The amount of monoethanolamine degraded was 0.61 percent. It can therefore be seen that by adding triethanolamine considerably less degradation of monoethanoline occurs.

EXAMPLE 4

31.0 gms. of monoethanolamine and 244.0 gms. of water were charged into a reactor as described in Example 1. In addition 3.1 gms. of triethanolamine was added which is equivalent to approximately 10 percent by weight of the monoethanolamine. 16.5 gms. of carbon dioxide and 12.2 gms. of hydrogen sulfide were added in the manner described above and the reaction was heated at 153° C. for 4.1 hours at 197 p.s.i.g. pressure. 30.8 gms. of monoethanolane was recovered equivalent to 99.56 percent of starting material.

The analysis tests of the solutions described in the above examples were carried out and an F & M Model 810 gas chromatograph using 10 percent polyphenylether and 2 percent "Carbowax" 20M on Fluoropak 80 support in a 4 ft. x ¼" O.D. stainless steel column.

I claim:
1. A method of stabilizing an aqueous monoethanolamine solution against degradation in the presence of a gas selected from the group consisting of carbon dioxide and hydrogen sulfide which comprises incorporating in said solution a stabilizing amount of a compound of the formula:

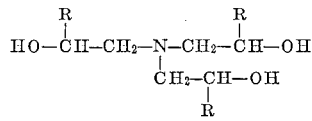

wherein R is a radical selected from the group consisting of hydrogen, and an alkyl having from 1 to 4 carbon atoms.

2. A method as claimed in claim 1 wherein the said compound is triethanolamine.

3. A method as claimed in claim 2 wherein the triethanolamine is present in an amount of from 0.1 percent to 15 percent by weight of monoethanolamine.

4. A method as claimed in claim 2 wherein the triethanolamine is present in an amount of from 0.5 percent to 5 percent by weight of monoethanolamine.

5. A method as claimed in claim 1 wherein the said compound is one selected from the group consisting of triethanolamine, triisopropanolamine and triisobutanolamine.

6. A method as claimed in claim 5 wherein said compound is present in an amount of from 0.1 percent to 15 percent by weight of said monoethanolamine.

7. A method as claimed in claim 5 wherein said compound is present in an amount of from 0.5 percent to 5 percent by weight of monoethanolamine.

References Cited

UNITED STATES PATENTS

| | | | |
|---|---|---|---|
| 2,901,513 | 8/1959 | Thomas | 260—584 |
| 3,137,654 | 6/1964 | Johnson et al. | 252—189 |
| 3,372,981 | 3/1968 | Ravner et al. | 252—189 |

LEON D. ROSDOL, Primary Examiner

I. GLUCK, Assistant Examiner

U.S. Cl. X.R.

252—192, 403, 407; 23—2; 260—584